US012624725B2

(12) United States Patent
Maekawa

(10) Patent No.: US 12,624,725 B2
(45) Date of Patent: May 12, 2026

(54) BENDING MESHING TYPE GEAR DEVICE

(71) Applicant: SUMITOMO HEAVY INDUSTRIES, LTD., Tokyo (JP)

(72) Inventor: Kazuyoshi Maekawa, Osaka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/209,914

(22) Filed: May 16, 2025

(65) Prior Publication Data

US 2025/0361905 A1 Nov. 27, 2025

(30) Foreign Application Priority Data

May 23, 2024 (JP) ................................. 2024-083784

(51) Int. Cl.
| | |
|---|---|
| *F16C 19/08* | (2006.01) |
| *F16C 33/66* | (2006.01) |
| *F16H 49/00* | (2006.01) |
| *F16H 57/04* | (2010.01) |

(52) U.S. Cl.
CPC .......... *F16C 19/08* (2013.01); *F16C 33/6603* (2013.01); *F16H 49/001* (2013.01); *F16H 57/0464* (2013.01); *F16H 57/0471* (2013.01); *F16C 2361/61* (2013.01); *F16H 2049/003* (2013.01)

(58) Field of Classification Search
CPC ............................... F16H 49/001; F16C 19/08
See application file for complete search history.

(56) References Cited

U.S. PATENT DOCUMENTS

| | | | | |
|---|---|---|---|---|
| 6,563,243 B2 * | 5/2003 | Obara | ................... | F16C 35/061 |
| | | | | 310/90 |
| 11,215,228 B2 * | 1/2022 | Nanasawa | ............... | F16C 19/16 |
| 2013/0305864 A1 * | 11/2013 | Schaefer | .............. | F16H 49/001 |
| | | | | 74/412 R |
| 2018/0187764 A1 | 7/2018 | Handa et al. | | |

FOREIGN PATENT DOCUMENTS

WO      WO 2017/006442 A1      1/2017

* cited by examiner

*Primary Examiner* — Jake Cook
(74) *Attorney, Agent, or Firm* — WTA IP Law P.C.

(57) ABSTRACT

A bending meshing type gear device includes a wave generator and a wave generator bearing disposed between the wave generator and an external gear. The wave generator bearing includes a first rolling element row with first rolling elements aligned in a circumferential direction, a first holder, a second rolling element row offset in an axial direction from the first element row with second rolling elements aligned in the circumferential direction, and a second holder. The first holder includes first pockets accommodating the first rolling elements, each pocket is open toward a side of the second rolling element row in the axial direction. The second holder includes second pockets accommodating the second rolling elements, each pocket is open toward a side of the first rolling element row in the axial direction. A spacer member is disposed between the first and the second rolling element rows.

12 Claims, 4 Drawing Sheets

(LOAD SIDE)

(COUNTER-LOAD SIDE)

BENDING MESHING TYPE GEAR DEVICE

CROSS-REFERENCE TO RELATED APPLICATIONS

This application claims priority to Japanese Patent Application No. 2024-083784, filed on May 23, 2024, which is incorporated by reference herein in its entirety.

BACKGROUND

Technical Field

A certain embodiment of the present invention relates to a bending meshing type gear device.

Description of Related Art

In the related art, a bending meshing type gear device is known which includes an external gear bent and deformed by a wave generator and a wave generator bearing disposed between the wave generator and the external gear (for example, refer to the related art).

In this type of bending meshing type gear device, when the wave generator bearings are arranged in double rows or the like, a space may be secured between two rows of rolling elements, and a lubricant (grease) may be held in the space in some cases.

SUMMARY

According to an aspect of the present invention, there is provided a bending meshing type gear device including a wave generator, a bending gear bent and deformed by the wave generator, and a wave generator bearing disposed between the wave generator and the bending gear. The wave generator bearing includes a first rolling element row in which a plurality of first rolling elements are aligned in a circumferential direction, a first holder that holds the plurality of first rolling elements, a second rolling element row disposed at a position offset in an axial direction from the first rolling element row, in which a plurality of second rolling elements are aligned in the circumferential direction, and a second holder that holds the plurality of second rolling elements. The first holder includes a plurality of first pockets, each of which accommodates each of the plurality of first rolling elements. The first pocket is open toward a side of the second rolling element row in the axial direction. The second holder includes a plurality of second pockets, each of which accommodates each of the plurality of second rolling elements. The second pocket is open toward a side of the first rolling element row in the axial direction. A spacer member is disposed between the first rolling element row and the second rolling element row.

DETAILED DESCRIPTION

However, when only the space between the rolling element rows is simply filled with the lubricant, the lubricant may remain in the space, and the rolling elements may not be preferably lubricated in some cases.

It is desirable to preferably lubricate a wave generator bearing.

Hereinafter, an embodiment of the present invention will be described in detail with reference to the drawings.

Configuration of Bending Meshing Type Gear Device

Figure 1:
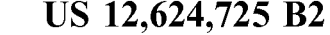
FIG. 1 is a sectional view illustrating a bending meshing type gear device according to an embodiment.

FIG. 1 is a sectional view illustrating a bending meshing type gear device 1 according to the present embodiment.

Hereinafter, a direction along a rotary axis O1 in the drawing is defined as an "axial direction", a direction perpendicular to the rotary axis O1 is defined as a "radial direction", and a rotation direction around the rotary axis O1 is defined as a "circumferential direction". In addition, in the axial direction, a side connected to an external driven member E (left side in the drawing) will be referred to as a "load side", and a side opposite to the load side (right side in the drawing) will be referred to as a "counter-load side".

As illustrated in FIG. 1, the bending meshing type gear device 1 is a tubular bending meshing type gear device in which an external gear 12 is bent and deformed to transmit a rotating motion around the rotary axis O1.

Specifically, the bending meshing type gear device 1 includes a wave generator shaft 10, an external gear 12 bent and deformed by the wave generator shaft 10, a first internal gear 22$g$ and a second internal gear 23$g$ which mesh with the external gear 12, and a wave generator bearing 15. In addition, the bending meshing type gear device 1 includes a first casing 22, an internal gear member 23, a second casing 24, a first cover 26, a second cover 27, and a main bearing 33.

The wave generator shaft 10 has a hollow shaft shape, and includes a wave generator 10$a$ having an elliptical outer shape (outer periphery) in a cross section perpendicular to the rotary axis O1 (having a major axis and a minor axis which are perpendicular to each other), and shaft portions 10$b$ and 10$c$ provided on both sides of the wave generator 10$a$ in the axial direction and having a circular outer shape in a cross-section perpendicular to the rotary axis O1. The elliptical shape is not limited to a geometrically perfect ellipse, and includes a substantially elliptical shape. The wave generator shaft 10 rotates around the rotary axis O1, and a center of the outer shape in a cross section perpendicular to the rotary axis O1 of the wave generator 10$a$ coincides with the rotary axis O1. The wave generator shaft 10 is an input shaft connected to a drive source (not illustrated) such as a motor, and to which a driving force is input. In addition, the wave generator shaft 10 may be a solid shaft.

The external gear 12 is a cylindrical metallic member having flexibility, and teeth are provided on an outer periphery of the external gear 12. The external gear 12 is an example of a bending gear according to the present invention.

The first internal gear 22g and the second internal gear 23g are disposed such that an axial center thereof coincides with the rotary axis O1.

The first internal gear 22g and the second internal gear 23g are aligned in the axial direction, and mesh with the external gear 12. Specifically, one of the first internal gear 22g and the second internal gear 23g meshes with a tooth portion on one side from the center of the external gear 12 in the axial direction, and the other meshes with a tooth portion on the other side from the center of the external gear 12 in the axial direction. The first internal gear 22g is formed in such a manner that an internal tooth is provided at a corresponding location on an inner peripheral portion of the first casing 22. The second internal gear 23g is formed in such a manner that an internal tooth is provided at a corresponding location of an inner peripheral portion of the internal gear member 23.

The wave generator bearing 15 is disposed between the wave generator 10a and the external gear 12.

A specific configuration of the wave generator bearing 15 will be described later.

Both sides of the external gear 12 in the axial direction are provided with spacer rings 36 and 37 serving as regulating members that come into contact with both sides of the external gear 12 to regulate movements in the axial direction.

The first casing 22 and the second casing 24 are connected to each other by a bolt 57, and cover a radially outer side of the first internal gear 22g, the second internal gear 23g, and the external gear 12. In these casings, as described above, the first casing 22 is provided with internal teeth in a portion of the inner peripheral portion, and is integrally formed with the first internal gear 22g. In addition, when the bending meshing type gear device 1 is connected to an external mating device, the first casing 22 and the second casing 24 are connected to the mating device by co-fastening.

At least a portion of the internal gear member 23 is disposed inside of the second casing 24 in the radial direction, and outside of the wave generator shaft 10 in the radial direction. In addition, as described above, the internal gear member 23 is provided with internal teeth in a portion of the inner peripheral portion, and is integrally formed with the second internal gear 23g.

The first cover 26 is connected to the first casing 22 by a bolt 51, and covers a meshing location between the external gear 12 and the first internal gear 22g from the counter-load side. An input bearing 31 (for example, a ball bearing) is disposed between the first cover 26 and a shaft portion 10b of the wave generator shaft 10, and the first cover 26 rotatably supports the wave generator shaft 10 via the input bearing 31.

The second cover 27 is connected to the internal gear member 23 by a bolt 52, and covers a meshing location between the external gear 12 and the second internal gear 23g from the load side. An input bearing 32 (for example, a ball bearing) is disposed between the second cover 27 and a shaft portion 10c of the wave generator shaft 10, and the second cover 27 rotatably supports the wave generator shaft 10 via the input bearing 32. When the bending meshing type gear device 1 is connected to the external mating device, the second cover 27 and the internal gear member 23 are connected to a driven member of the mating device by co-fastening, and output decelerated rotation to the driven member.

For example, the main bearing 33 is a ball bearing, and is disposed between the internal gear member 23 and the second casing 24. The second casing 24 rotatably supports the internal gear member 23 via the main bearing 33. The main bearing 33 is not limited to the ball bearing, and may be a cross roller bearing, for example. In addition, the main bearing 33 does not need to have a dedicated inner ring or outer ring. In addition, the main bearing 33 may be a sealed bearing in which a lubricant is internally enclosed.

Description of Operation

In the bending meshing type gear device 1, when the wave generator shaft 10 is rotationally driven by a drive source such as a motor, the motion of the wave generator 10a is transmitted to the external gear 12 via the wave generator bearing 15. In this case, the external gear 12 is constrained to a shape along an outer peripheral surface of the wave generator 10a, and is bent into an elliptical shape having a major axis portion and a minor axis portion, when viewed in the axial direction. Furthermore, since the external gear 12 meshes at a fixed major axis position of the first internal gear 22g and the wave generator 10a, the external gear 12 does not rotate at a speed equal to that of the wave generator 10a, and the major axis position of the wave generator 10a moves due to bending deformation.

For example, when the number of teeth of the external gear 12 is 100 and the number of teeth of the first internal gear 22g is 102, every time a meshing position turns once, the external gear 12 rotates (self-rotation) by a difference in the number of teeth from the first internal gear 22g. According to the above-described number of teeth, the rotating motion of the wave generator shaft 10 is decelerated at a reduction ratio of 100:2, and is transmitted to the external gear 12.

Meanwhile, the external gear 12 also meshes with the second internal gear 23g. Therefore, for example, when the number of teeth of the second internal gear 23g and the number of teeth of the external gear 12 are the same, the external gear 12 and the second internal gear 23g rotate at an equal speed. Therefore, the rotating motion of the wave generator shaft 10 is decelerated at the reduction ratio of 100:2, and is transmitted to the internal gear member 23 and the second cover 27. The rotating motion is output to the driven member.

Material of Each Member

A material of each member excluding the wave generator bearing 15 is not particularly limited, but is configured as follows in the present embodiment.

The wave generator shaft 10, the external gear 12, and the spacer rings 36 and 37 are made of a metallic material such as a steel material. Although not particularly limited, more specifically, the wave generator shaft 10 is formed of a steel material such as chromium molybdenum steel. The wave generator shaft 10 may be made of an aluminum alloy. The external gear 12 is made of a steel material such as nickel-chrome-molybdenum steel. The spacer rings 36 and 37 are made of a steel material such as a high carbon chromium bearing steel material.

The input bearings 31 and 32 and the main bearing 33, as well as the inner and outer rings and the rolling elements, are made of metal (for example, high carbon chromium bearing steel).

Each of the bolts 51, 52, and 57 is made of metal (for example, a rolled steel material for a general structure, a carbon steel wire for cold forging, a carbon steel material for a mechanical structure, or the like).

Meanwhile, the first casing 22, the internal gear member 23, the second casing 24, the first cover 26, and the second cover 27 are not particularly limited, but are made of a resin (resin-based material).

As the resin used for the second casing 24, the first cover 26, and the second cover 27, a resin having a reinforcing fiber contained in a base material of the resin is used in the present embodiment. A resin that does not have the reinforcing fiber may be used.

As the resin of the base material, for example, an engineering plastic (general-purpose engineering plastic) having heat resistance of approximately 50° C. to 60° C. is used. Specifically, examples thereof include polyamide (PA), polycarbonate (PC), polyacetal (POM), modified polyphenylene ether (m-PPE), polybutylene terephthalate (PBT), and the like. The heat resistance here does not mean a temperature at which the shape can be statically maintained, but means a temperature at which performance of the gear can be maintained.

In addition, examples of the reinforcing fibers include a glass fiber, an aramid fiber, a polyethylene fiber, a zylon fiber, a boron fiber, and the like.

As the resin used for the first casing 22 and the internal gear member 23, a resin having the reinforcing fiber contained in the base material of the resin is used in the present embodiment.

The resin of the base material is preferably a resin having heat resistance of 70° C. or higher, and, for example, a super engineering plastic (special engineering plastic) having heat resistance of 100° C. or higher is used. Specifically, examples thereof include polyether ether ketone (PEEK), polyamide imide (PAI), polyphenylene sulfide (PPS), polytetrafluoroethylene (PTFE), aromatic polyamide (PPA), liquid crystal polymer (LCP), polysulfone (PSU), polyether sulfone (PES), polyether imide (PEI), polyarylate (PAR), thermoplastic polyimide (TPI), and the like.

Examples of the reinforcing fibers include fibers having higher thermal conductivity than the reinforcing fibers described above (for example, a carbon fiber or the like).

The resin and the reinforcing fibers which are used for the first casing 22 and the internal gear member 23 are preferably higher in thermal conductivity and heat resistance than the second casing 24, the first cover 26, and the second cover 27 in view of heat dissipation. However, the resin and the reinforcing fibers may be the same as the examples described in the second casing 24, the first cover 26, and the second cover 27.

Specific Configuration of Wave Generator Bearing

Figure 2:
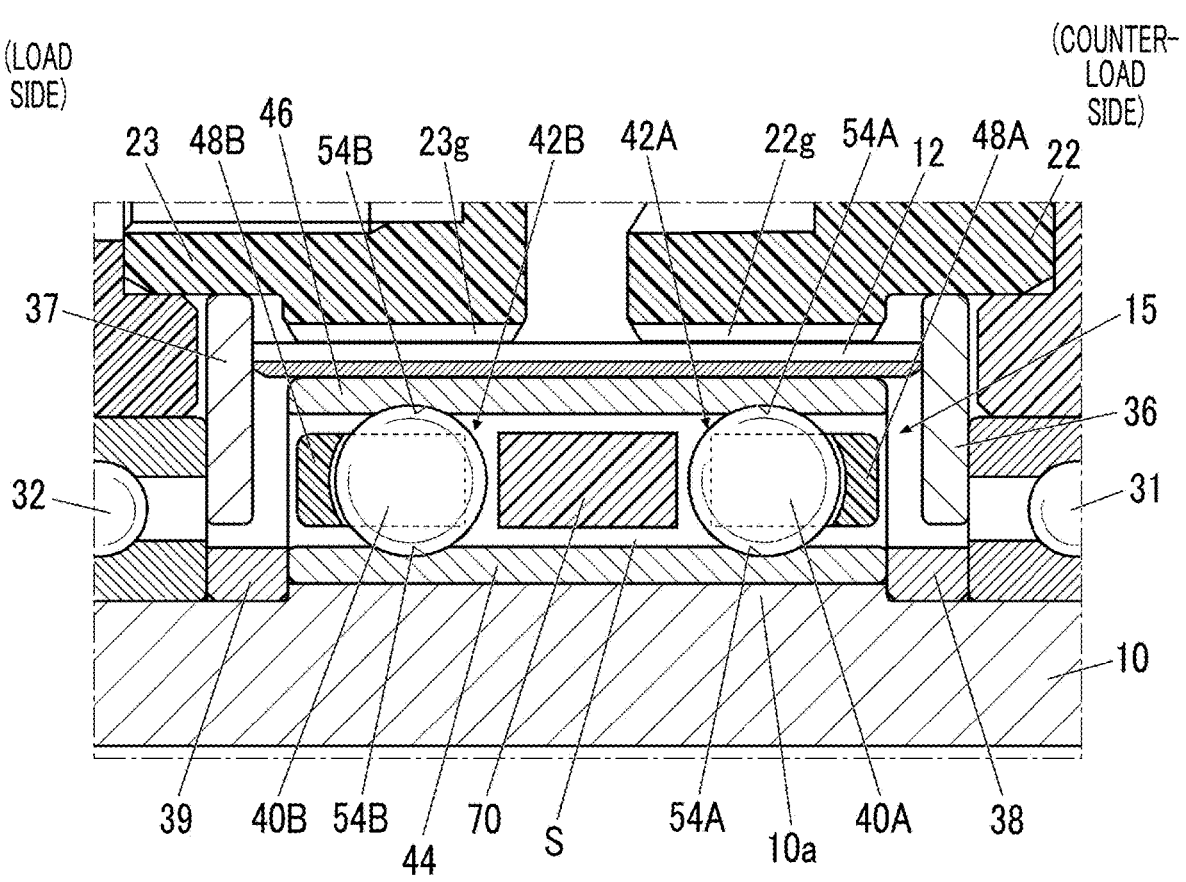
FIG. 2 is an enlarged view of a portion E in FIG. 1.
Figure 3:
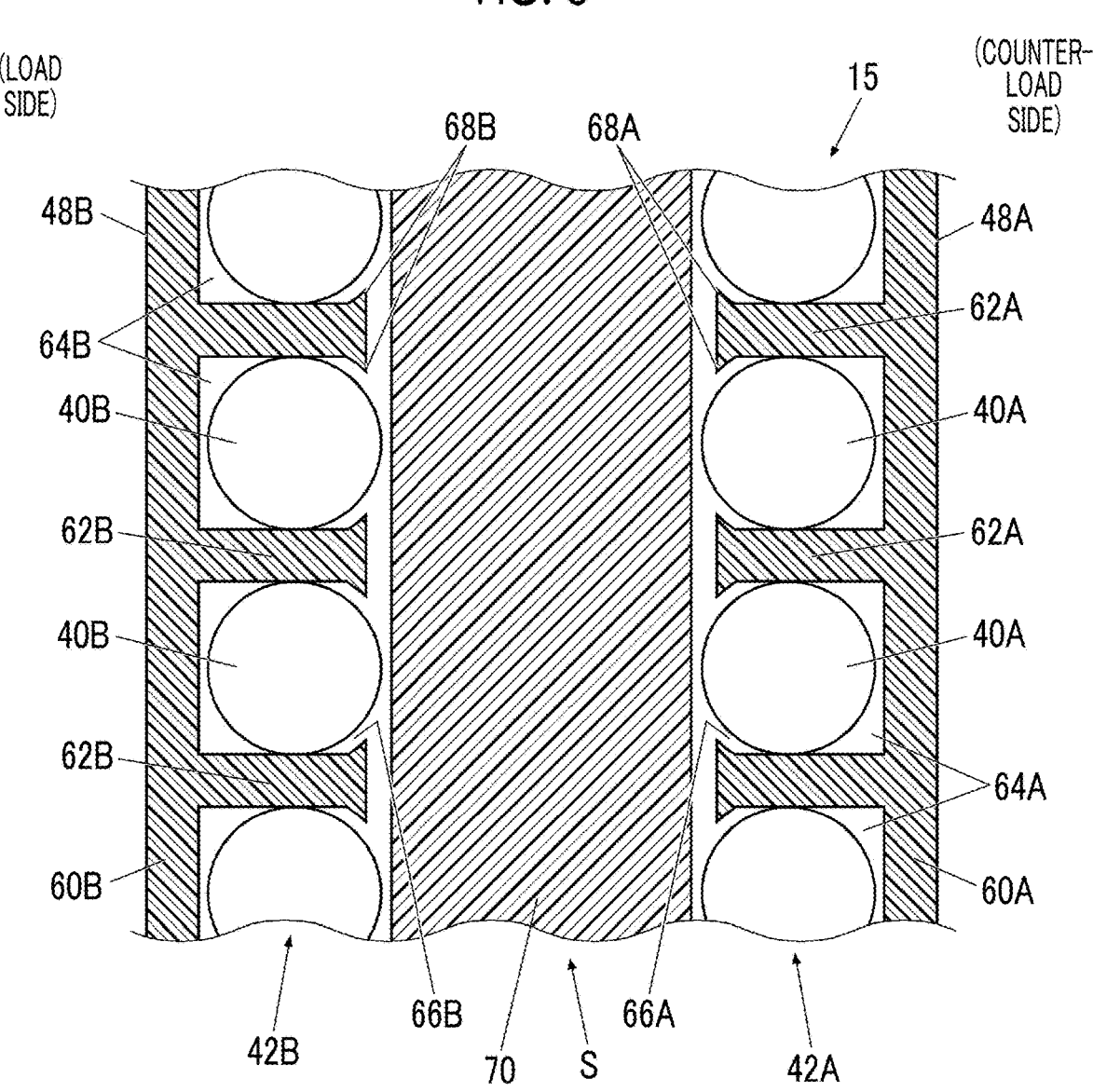
FIG. 3 is a view illustrating a positional relationship between a rolling element row, a holder, and a spacer member in a wave generator bearing according to the embodiment.

FIG. 2 is an enlarged view of a portion E in FIG. 1. FIG. 3 is a view in which a cross section of the wave generator bearing 15 is developed at a certain position in the radial direction, and is a view illustrating a positional relationship between a rolling element row, a holder, and a spacer member (to be described later) in the wave generator bearing 15.

As illustrated in FIGS. 2 and 3, the wave generator bearing 15 is a double-row ball bearing in the present embodiment, and includes two rows of rolling element rows and an inner ring 44 and an outer ring 46 which are common to the two rows of rolling element rows.

Specifically, the wave generator bearing 15 includes a first rolling element row 42A in which a plurality of first rolling elements 40A are aligned in the circumferential direction, a first holder 48A that holds the plurality of first rolling elements 40A, a second rolling element row 42B disposed at a position offset in the axial direction with respect to the first rolling element row 42A, in which a plurality of second rolling elements 40B are aligned in the circumferential direction, a second holder 48B that holds the plurality of second rolling elements 40B, and the inner ring 44 and the outer ring 46.

Rolling Element

The first rolling element 40A is a sphere in the present embodiment, but may be various rolling elements such as a roller. The first rolling element row 42A overlaps the first internal gear 22g at a position in the axial direction.

The second rolling element 40B is a sphere in the present embodiment, but may be various rolling elements such as a roller, or may be a rolling element having a type different from that of the first rolling element 40A (for example, a sphere and a roller). The second rolling element row 42B overlaps the second internal gear 23g at a position in the axial direction.

The first rolling element 40A and the second rolling element 40B are made of metal (for example, high carbon chromium bearing steel or the like).

Inner Ring and Outer Ring

For example, the inner ring 44 is fixed to the wave generator 10a by bonding, press-fitting, or the like. The inner ring 44 is flexible, and is fixed in a state of being bent and deformed into an elliptical shape by being fitted to the wave generator 10a. Regulating members 38 and 39 that regulate movements in the axial movement of the inner ring 44 are disposed on both sides of the inner ring 44 in the axial direction between the inner ring 44 and the input bearings 31 and 32, and are externally fitted to the wave generator shaft 10.

The inner ring 44 may be integrally formed of the same member as the wave generator 10a. That is, an outer peripheral surface of the wave generator 10a may form the inner ring of the wave generator bearing 15.

The outer ring 46 is fitted to an inner periphery of the external gear 12. The outer ring 46 is flexible, and is bent and deformed via the inner ring 44 and the rolling element rows 42A and 42B in association with the rotation of the wave generator 10a.

The outer ring 46 may be integrally formed of the same member as the external gear 12. That is, an inner peripheral surface of the external gear 12 may form the outer ring of the wave generator bearing 15.

A first rolling contact surface 54A on which the first rolling element 40A rolls and a second rolling contact surface 54B on which the second rolling element 40B rolls are formed in the inner ring 44.

The first rolling contact surface 54A on which the first rolling element 40A rolls and the second rolling contact surface 54B on which the second rolling element 40B rolls are formed in the outer ring 46.

The first rolling contact surface 54A and the second rolling contact surface 54B have a groove shape into which a portion of the rolling elements 40A and 40B is fitted. However, the shape of the rolling contact surfaces 54A and 54B is not particularly limited, and, for example, the rolling contact surfaces 54A and 54B may have a rectangular groove shape formed along the rolling elements 40A and 40B serving as rollers, or do not need to have the groove shape. The first rolling contact surface 54A regulates the movement of the first rolling element 40A in the axial direction, and the second rolling contact surface 54B regulates the movement of the second rolling element 40B in the axial direction.

The inner ring 44 and the outer ring 46 are made of metal (for example, high carbon chromium bearing steel or the like).

Holder

The first holder 48A holds the plurality of first rolling elements 40A to be rotatable around the rotary axis O1 (refer to FIG. 1), and is rotatable around the rotary axis O1 together with the first rolling element row 42A. The first holder 48A is not particularly limited, but is made of a resin (resin-based material).

The first holder 48A includes a first ring portion 60A disposed on the counter-load side with respect to the first rolling element row 42A, a plurality of first pillar portions 62A protruding from the first ring portion 60A to the load side in the axial direction, and a plurality of first pockets 64A formed between the first pillar portions 62A adjacent to each other in the circumferential direction and accommodating each of the plurality of first rolling elements 40A.

The first holder 48A is formed in a comb shape by the first ring portion 60A and the plurality of first pillar portions 62A. The comb-shaped first holder 48A does not include a ring portion disposed on the load side with respect to the first rolling element row 42A.

The first pillar portions 62A are aligned at an interval in the circumferential direction. The first pillar portions 62A are cantilevered by the first ring portion 60A, and the load side is a free end.

The first pocket 64A is open toward the load side (side of the second rolling element row 42B) in the axial direction, and a first opening portion 66A is formed at an opening location of the first pocket 64A.

The first holder 48A includes a first falling prevention portion 68A that prevents the first rolling element 40A from falling outward of the first pocket 64A via the first opening portion 66A.

The first falling prevention portion 68A is configured to include a protrusion portion (claw portion) that protrudes inward in the circumferential direction of the first pocket 64A in a tip portion of each of the first pillar portions 62A adjacent to each other in the circumferential direction. The first falling prevention portion 68A of the present embodiment is integrally provided with the same member as the first pillar portion 62A. However, the first falling prevention portion 68A may be provided separately from the first pillar portion 62A.

The second holder 48B holds the plurality of second rolling elements 40B to be rotatable around the rotary axis O1 (refer to FIG. 1), and is rotatable around the rotary axis O1 together with the second rolling element row 42B. The second holder 48B is not particularly limited, but is made of a resin (resin-based material).

The second holder 48B includes a second ring portion 60B disposed on the load side with respect to the second rolling element row 42B, a plurality of second pillar portions 62B protruding from the second ring portion 60B to the counter-load side in the axial direction, and a plurality of second pockets 64B formed between the second pillar portions 62B adjacent to each other in the circumferential direction and accommodating each of the plurality of second rolling elements 40B. In the present embodiment, a positional relationship of each component (second ring portion 60B, second pillar portion 62B, and second pocket 64B) when the second holder 48B is viewed in the axial direction is the same as a positional relationship of each component (first ring portion 60A, first pillar portion 62A, and first pocket 64A) when the first holder 48A is viewed in the axial direction.

The second holder 48B is formed in a comb shape by the second ring portion 60B and the plurality of second pillar portions 62B. The comb-shaped second holder 48B does not include a ring portion disposed on the counter-load side with respect to the second rolling element row 42B.

The second pillar portions 62B are aligned at an interval in the circumferential direction. The second pillar portions 62B are cantilevered by the second ring portion 60B, and the counter-load side is a free end.

The second pocket 64B is open toward the counter-load side (side of the first rolling element row 42A) in the axial direction, and the second opening portion 66B is formed at an opening location of the second pocket 64B.

The second holder 48B includes a second falling prevention portion 68B that prevents the second rolling element 40B from falling outward of the second pocket 64B via the second opening portion 66B.

The second falling prevention portion 68B is configured to include a protrusion portion (claw portion) that protrudes inward in the circumferential direction of the second pocket 64B in a tip portion of each of the second pillar portions 62B adjacent to each other in the circumferential direction. The second falling prevention portion 68B of the present embodiment is integrally provided with the same member as the second pillar portion 62B. However, the second falling prevention portion 68B may be provided separately from the second pillar portion 62B.

Spacer Member

A spacer member 70 is disposed in a bearing internal space S between the first rolling element row 42A and the second rolling element row 42B inside the wave generator bearing 15.

The spacer member 70 is formed in a substantially cylindrical shape, and is disposed to be movable in the radial direction and the axial direction in the bearing internal space S.

Specifically, the spacer member 70 is disposed to be movable in the radial direction between an outer periphery of the inner ring 44 and an inner periphery of the outer ring 46. That is, an inner diameter of the spacer member 70 has a predetermined clearance with respect to an outer diameter of the inner ring 44, and an outer diameter of the spacer member 70 has a predetermined clearance with respect to an inner diameter of the outer ring 46. Here, the "inner ring" or the "outer ring" is replaced with the wave generator 10a or the external gear 12 when the wave generator 10a or the external gear 12 is integrally provided as the same member.

In addition, the spacer member 70 is disposed to be movable in the axial direction between the first rolling element 40A and the second rolling element 40B. In the first rolling element 40A and the second rolling element 40B, an end portion protrudes inward in the axial direction of the wave generator bearing 15 with respect to the holders 48A and 48B that hold each of the first rolling element 40A and the second rolling element 40B. Therefore, positions of the spacer member 70 in the axial direction are different in both the first holder 48A and the second holder 48B. That is, the spacer member 70 does not come into contact with any of the first holder 48A and the second holder 48B.

A material of the spacer member 70 is not particularly limited, and may be metal or a resin, for example. However, it is preferable that the spacer member 70 is made of a resin (resin-based material) in view of the following points. The spacer member 70 is likely to come into contact with the rolling elements 40A and 40B made of a metal, is lightweight, and has self-lubricating properties.

A lubricant (not illustrated) is accommodated (disposed) inside the wave generator bearing 15. It is preferable to adopt a grease having a certain degree of hardness from a viewpoint of holding the lubricant inside the bearing internal space S. From this viewpoint, a penetration number of the grease is preferably No. 1 or higher, and is more preferably No. 1 to No. 2. The penetration number as referred to herein indicates a number obtained by classifying the grease specified in JIS K2220 according to a range of worked penetration.

However, the lubricant is not limited to the grease, and may be a lubricating oil or the like.

Technical Effects of Present Embodiment

As described above, according to the present embodiment, the spacer member 70 is disposed in the bearing internal space S between the first rolling element row 42A and the second rolling element row 42B in the wave generator bearing 15.

In this manner, the bearing internal space S is narrowed, and the lubricant filling the bearing internal space S is easily supplied to raceway surfaces (rolling contact surfaces 54A and 54B) of the rolling elements 40A and 40B. Therefore, for example, even when the lubricant is a relatively hard grease or the like, the wave generator bearing 15 can be preferably lubricated.

In addition, according to the present embodiment, the spacer member 70 is disposed to be movable in the radial direction between the outer periphery of the inner ring 44 and the inner periphery of the outer ring 46.

In this manner, the spacer member 70 moves in the bearing internal space S in association with the movement or a posture change of the bending meshing type gear device 1 itself. As a result, the grease in the bearing internal space S is easily supplied to the raceway surfaces (rolling contact surfaces 54A and 54B) of the rolling elements 40A and 40B.

Other

Hitherto, the embodiment of the present invention has been described. However, the present invention is not limited to the above-described embodiment.

For example, in the above-described embodiment, a case where the wave generator bearing 15 is a double-row bearing has been described as an example. However, the wave generator bearing 15 may include at least two rolling element rows, and the inner ring and the outer ring do not need to be common to the rolling element rows.

Figure 4:
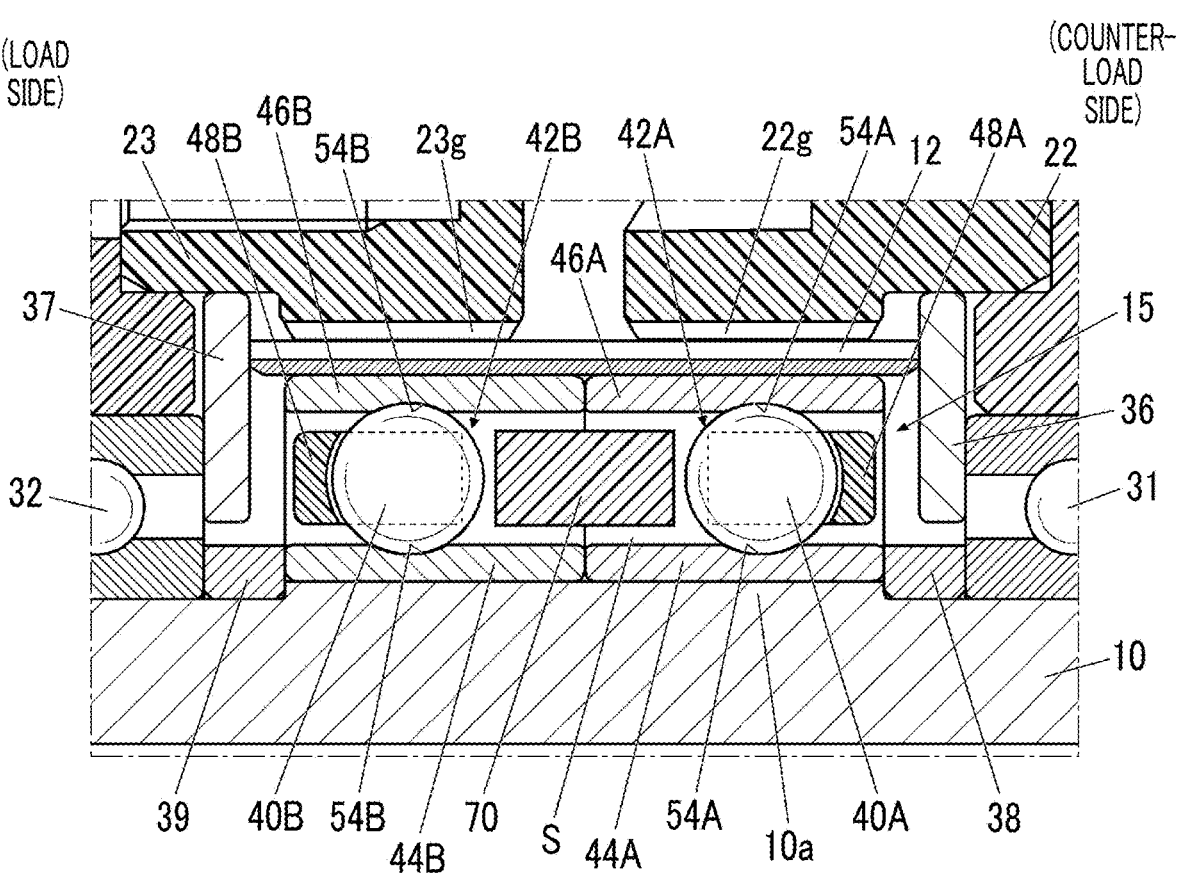
FIG. 4 is a view illustrating a modification example of the wave generator bearing according to the embodiment, and is a partial sectional view illustrating the same portion as that in FIG. 3.

Specifically, as illustrated in FIG. 4, the wave generator bearing 15 may be one in which two rows of single-row bearings are aligned. That is, in the wave generator bearing 15, the first inner ring 44A and the first outer ring 46A which support the first rolling element 40A and the second inner ring 44B and the second outer ring 46B which support the second rolling element 40B may be separately provided.

In addition, the wave generator bearing may include three or more rolling element rows. In this case, the spacer member may be disposed in each of the rolling element rows adjacent to each other in the axial direction.

In addition, in the above-described embodiment, a so-called tubular type has been described as an example of the bending meshing type gear device 1. However, the present invention is not limited thereto, and, for example, is also applicable to a so-called cup type or top hat type bending meshing type gear device.

In addition, details in the above-described embodiment can appropriately be changed within the scope not departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A bending meshing type gear device comprising:
a wave generator;
a bending gear bent and deformed by the wave generator; and
a wave generator bearing disposed between the wave generator and the bending gear,
wherein the wave generator bearing includes
a first rolling element row in which a plurality of first rolling elements are aligned in a circumferential direction,
a first holder that holds the plurality of first rolling elements,
a second rolling element row disposed at a position offset in an axial direction from the first rolling element row, in which a plurality of second rolling elements are aligned in the circumferential direction, and
a second holder that holds the plurality of second rolling elements,
the first holder includes a plurality of first pockets, each of which accommodates each of the plurality of first rolling elements,
the first pocket is open toward a side of the second rolling element row in the axial direction,
the second holder includes a plurality of second pockets, each of which accommodates each of the plurality of second rolling elements,
the second pocket is open toward a side of the first rolling element row in the axial direction, and
a spacer member is disposed between the first rolling element row and the second rolling element row.

2. The bending meshing type gear device according to claim 1,
wherein the wave generator bearing includes an outer ring that is common to the first rolling element row and the second rolling element row.

3. The bending meshing type gear device according to claim 2,
wherein the outer ring is fitted to an inner periphery of the bending gear, is flexible, and is bendably deformed via an inner ring of the wave generator bearing, and the first rolling element row and the second rolling element row in association with rotation of the wave generator.

4. The bending meshing type gear device according to claim 1,
wherein the wave generator bearing includes an inner ring that is common to the first rolling element row and the second rolling element row.

5. The bending meshing type gear device according to claim 4,
wherein the inner ring is flexible, and is fixed to the wave generator in a state of being bendably deformed into an elliptical shape by being fitted to the wave generator.

6. The bending meshing type gear device according to claim 1,
wherein the spacer member is disposed to be movable in a radial direction between an outer periphery of an inner ring and an inner periphery of an outer ring.

7. The bending meshing type gear device according to claim 6,
wherein the spacer member includes an inner diameter having a predetermined clearance with respect to an outer diameter of the inner ring, and an outer diameter having a predetermined clearance with respect to an inner diameter of the outer ring.

8. The bending meshing type gear device according to claim 1, wherein the spacer member does not come into contact with any of the first holder and the second holder.

9. The bending meshing type gear device according to claim 8, wherein the first holder holds the plurality of first rolling elements to be rotatable around a rotation axis, and is rotatable around the rotation axis together with the first rolling element row, and the second holder holds the plurality of second rolling elements to be rotatable around the rotation axis, and is rotatable around the rotation axis together with the second rolling element row.

10. The bending meshing type gear device according to claim 9, wherein the first holder includes a first ring portion disposed on a counter-load side with respect to the first rolling element row, and a plurality of first pillar portions protruding from the first ring portion to a load side in the axial direction, the second holder includes a second ring portion disposed on the load side with respect to the second rolling element row, and a plurality of second pillar portions protruding from the second ring portion to the counter-load side in the axial direction.

11. The bending meshing type gear device according to claim 10, wherein the first pillar portions are aligned at an interval in the circumferential direction, and are cantilevered by the first ring portion, and the second pillar portions are aligned at an interval in the circumferential direction, and are cantilevered by the second ring portion.

12. The bending meshing type gear device according to claim 1, wherein a grease having a penetration number of 1 or more is disposed between the first rolling element row and the second rolling element row.

* * * * *